United States Patent

Case

Patent Number: 5,720,034
Date of Patent: Feb. 17, 1998

[54] METHOD FOR SECURE KEY PRODUCTION

[76] Inventor: Jeffrey D. Case, 3001 Kimberlin Heights Rd., Knoxville, Tenn. 37920

[21] Appl. No.: 568,494

[22] Filed: Dec. 7, 1995

[51] Int. Cl.⁶ .................................................. G06F 11/00
[52] U.S. Cl. ..................... 395/187.01; 395/186; 380/21; 380/23; 380/30; 364/286.4
[58] Field of Search .................. 395/187.01, 186, 395/188.01, 726; 380/3, 4, 21, 23, 25, 30, 45, 49; 364/222.5, 286.4, 286.5, 260.81

[56] References Cited

U.S. PATENT DOCUMENTS

| | | | |
|---|---|---|---|
| 4,193,131 | 3/1980 | Lennon et al. | 375/2 |
| 4,227,253 | 10/1980 | Ehrsam et al. | 375/2 |
| 4,799,258 | 1/1989 | Davies | 380/21 |
| 4,924,515 | 5/1990 | Matyas et al. | 380/25 |
| 4,941,176 | 7/1990 | Matyas et al. | 380/21 |
| 5,001,752 | 3/1991 | Fischer | 380/23 |
| 5,136,643 | 8/1992 | Fischer | 380/23 |
| 5,315,658 | 5/1994 | Micali | 380/30 |
| 5,491,752 | 2/1996 | Kaufman et al. | 380/30 |
| 5,533,123 | 7/1996 | Force et al. | 380/4 |

*Primary Examiner*—Robert W. Beausoliel, Jr.
*Assistant Examiner*—Dieu-Minh Le
*Attorney, Agent, or Firm*—Luedeka, Neely & Graham, P.C.

[57] ABSTRACT

A method for exchanging a secure slave key between an agent and a manager which are connected by an unsecured digital computer network. A master key is provided, which is known to both the manager and the agent. The manager sends a request for an unpredictable number across the digital computer network to the agent. The agent receives the request and generates the unpredictable number, which is sent back to the manager across the digital computer network. The manager receives the unpredictable number, and uses it and the master key to produce a slave key. The agent likewise uses the unpredictable number and the master key to produce the slave key. In this manner, identical slave keys have been produced at both of the manager and the agent sites, without having to send the slave key across the unsecured digital computer network.

21 Claims, 1 Drawing Sheet

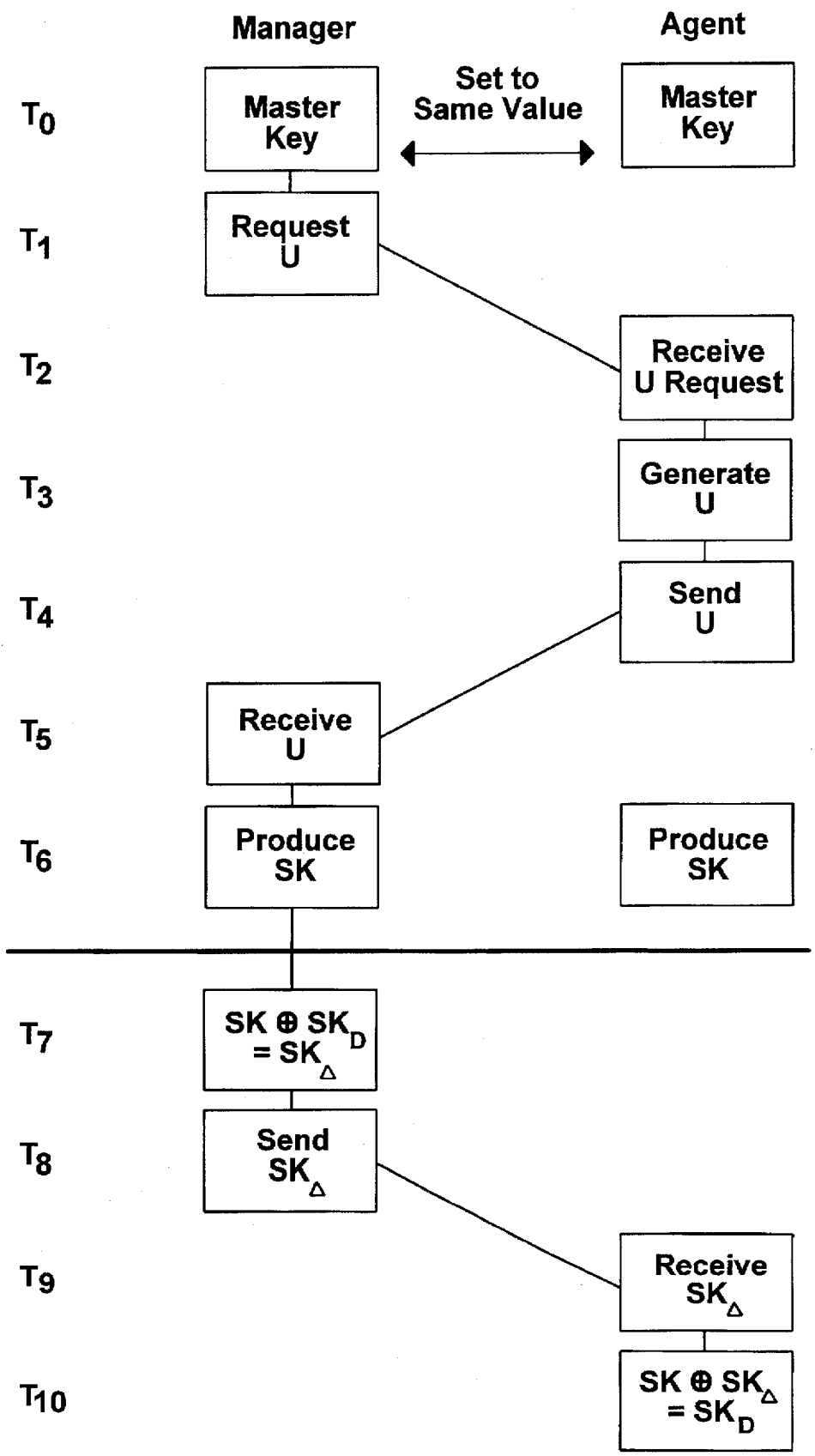

METHOD FOR SECURE KEY PRODUCTION

FIELD OF THE INVENTION

This invention relates to the field of encoding and decoding messages, and more particularly to the field of encoding and decoding digital messages transmitted over an unsecured computer network.

BACKGROUND OF THE INVENTION

Digital computer networks have, in the last several years, been increasingly relied upon for both controlling and monitoring other pieces of equipment. For example, many buildings make use of computer controlled air handling systems, which monitor the temperature and humidity of the air in different parts of the building. The information gathered is then used to adjust dampers, heaters, coolers, and fans. In this manner the computer network acts to regulate the monitored parameters within predefined limits. Those parts of the system which sense and gather information are typically called agents, while those parts which request such information, receive it, and act on it are typically called managers.

The information which is digitally transmitted over such a network, whether it be data generated by agents, commands sent by a manager, or otherwise, may travel over several different media, through various environments. For example, for a system such as that described above which is entirely located within a single building, there may be dedicated wiring provided, which is used exclusively for the computer system controlling the air handling. For a system which controls the environment in several buildings, the information may be sent using existing computer network wiring, on which all the other network data passing between the buildings is also carried.

For a system covering an even broader geographical area, the air handling data may be carried over telephone wires, possibly being handled by several different service providers. Alternately, a wide scale network, such as the Internet, could be used to transfer the information. If the air handling system is regulating buildings in different parts of the world, the air handling data may even be broadcast to a satellite, and then relayed back to an earth station, prior to arriving at its intended destination.

In each of the above examples of data transmission, it is possible for an interloper to surreptitiously intercept either the data flowing from an agent to a manager or coming from a manager, and by so doing have complete information as to the status of the building for which such information was intercepted. It is further possible for the interloper to inject in the communication of the information, and provide "false" agent data, which would cause the manager to send out control commands to correct a situation that didn't exist. Alternately, the interloper could send out such erroneous manager commands directly.

While the problems associated with the air handling system of a building may be insignificant to all but those who are responsible for them, they are exemplary of the types of problems which are encountered by users of unsecured computer networks. These problems take on considerably more significance if the system being controlled is not air handling, but building security, in which the agents receive input from sensors such as motion detectors and video cameras, and the manager provides control signals to systems such as door locks and fire control systems. Of even greater import is the use of such control systems for civil or national security.

To prevent the unauthorized manipulation of intercepted data, encoding schemes have been developed, whereby the information, before it is transmitted across the unsecured network, is altered according to a method which is known to both the agent and the manager. When the information is received, it is decoded back to the original form of the data. By sending only encoded data across the network, the sender, whether it be the agent or the manager, attempts to ensure that any interception of the data so transmitted will be unintelligible to the interloper. Likewise, it is hoped that any unauthorized information interjected onto the network by the interloper would not be properly encoded, and would thus be detected as a false message by the receiver.

One method used to encode and decode data has been the use of an invertible function, such as an XOR function. Encoding a message using an invertible function comprises transforming the message with another piece of information, or key, known only to the agent and the manager, and which must be kept secret. When the encoded message is received, it is transformed once again, using the same invertible function and the same key. This decode operation produces the original message. It is this characteristic of being able to perform the same operation twice, with the input of the same key, that defines the function as invertible.

The problem with this method of encoding is that if the key is learned by the interloper, he will be able to decode all former and future intercepted messages, and be able to encode his own interjected messages. Further, because the function is invertible, if the interloper acquires a decoded message and its associated encoded message, he will be able to use them to calculate the key used for encoding and decoding, and will again have the ability to intercept and interject properly encoded messages.

Once the key is learned by the interloper, not only are all messages so encoded compromised, but a new key must be used for all future messages if they are to remain uncompromised. For this reason, those who design agent-manager systems will typically change the key on which their encoding is based from time to time, in an attempt to stay ahead of those who may be intercepting the messages.

The optimal method would be to change the key used to encode the data with every data transmission made, so that the same key was never used twice. In such a situation, knowledge of previously used keys would not be a benefit in attempting to decode other messages. Unfortunately, in order to use a new key for each transmission, both the agent and the manager must be aware of the key that is being used, and therefore a secure means of transmitting the key must be available. In traditional encoding systems, there has not been a cost effective method of exchanging the new keys in a secure fashion.

There are also methods of protecting data, known as encryption techniques, which do not tend to have the same problems as the invertible function and key technique. However, encryption techniques typically require significant computing capacity, and are of limited utility in certain international environments, because the export and use of cryptographic technology in many countries is regulated or prohibited by either U.S. law or international treaty.

What is needed, therefore, is a method of distributing keys across an unsecured digital computer network, and a method of encoding information, where a new encoding key can be used for each data transmission, and where information about previously encoded and decoded messages will not provide sufficient information to encode or decode future messages. Further, there is a need for such a method as described that can be exported and used world-wide.

SUMMARY OF THE INVENTION

These and other needs are provided by a method for exchanging a secure slave key between an agent and a manager which are connected by an unsecured digital computer network. A master key is provided, which is known to both the manager and the agent. The manager sends a request for an unpredictable number across the digital computer network to the agent. The agent receives the request and generates the unpredictable number, which is sent back to the manager across the digital computer network. The manager receives the unpredictable number, and uses it and the master key to produce a slave key. The agent likewise uses the unpredictable number and the master key to produce the slave key. In this manner, identical slave keys have been produced at both of the manager and the agent sites, without having to send the slave key across the unsecured digital computer network. One or more messages can be encoded and decoded using the slave key.

In preferred embodiments, the slave key is produced by using the master key and the unpredictable number as input to a one-way (hash) function. Also, a desired slave key can be produced at the manager and agent sites by transforming the slave key using an invertible function and the desired slave key at the manager, to produce a delta slave key. The delta slave key is sent by the manager across the digital computer network to the agent, which receives the delta slave key, and uses it and the invertible function to transform the slave key into the desired slave key. Thus, a desired slave key is produced at both of the manager and the agent sites, without having to send the desired slave key across the unsecured digital computer network. The message is encoded and decoded using the desired slave key.

BRIEF DESCRIPTION OF THE DRAWINGS

The present invention may be better understood by reference to a detailed description of preferred embodiments when considered in conjunction with the following drawings wherein:

The FIGURE is a flowchart of the method for exchanging secure keys.

DETAILED DESCRIPTION OF THE INVENTION

In the background of this disclosure, an example was given which detailed the problems of using the same key to encode different messages sent across an unsecured digital computer network. The ultimate problem is, of course, compromise of the key, which leads to compromise of all messages encoded using that key. Use of just an invertible function to encode the message using the key does not provide sufficient protection of the key should the encoded message and the decoded message be intercepted and compared.

One solution to this problem is to use a different key for every message transmitted. When there are human operators at either end of the transmission, this is only an awkward and time consuming solution, as it must be done in some secure manner, such as by a media other than the computer network. When there are not human operators at either end of the transmission, but only component subsystems, there has heretofore been no method of communicating the new keys between the manager and the agent in such a manner that maintains the confidentiality of the keys.

A method according to the present invention provides a solution to this problem, which is particularly well suited to the limitations of embedded systems which need to make secure message transfers, but which do not allow for direct human intervention. As depicted in The FIGURE, each of the two systems between which a message will be transmitted, labeled in this depiction as the manager and the agent, have a master key which is set to the same value.

It will be appreciated that the agent and the manager may reside on separate computers or on the same computer. If they reside on separate computers, then an external digital computer network is the means by which the agent and the manager communicate. If they reside on the same computer, then, in addition to an external digital computer network, an internal digital computer network may be the means by which the agent and the manager communicate. An internal digital computer network may be, without limitation, protocols such as DDE, OLE, UNIX domain sockets, named pipes, and virtual networks.

The FIGURE depicts the master key as being set at time equals $T_0$. The other events depicted in The FIGURE occur at times equal to $T_1$ through $T_{10}$, which are arbitrary times occurring sometime after $T_0$. The master key may be an integer, floating point, or character value of any length. In a preferred embodiment, the length of the value is at least eight characters or digits, and in a most preferred embodiment, the length of the value is sixteen octets in length.

The master key can be set to the same value in each of the manager and agent in a variety of ways. If there is a secure channel of communication between the manager and agent, then the master key can be exchanged via this channel. Alternately, the master key can be exchanged by reference to a piece of information which both the manager and the agent have, without explicitly mentioning the value of this piece of information. In a further embodiment, the master key can be originally programmed into each of the manager and the agent at the time of manufacture. If it is possible to program either of the manager or agent at a later point in time, the master key can be sent by mail or courier to a human operator, who can program the device with the master key.

In the preferred embodiment of the invention, once the master key is set in the manager and agent, it is not necessary to ever reset the master key to a new value, because it will be sufficiently protected from discovery by interlopers, as will be explained in greater detail below. However, the master key could be changed from time to time according to the desires of the system operators.

The message transmission in the preferred embodiment is initiated by the manager, which sends a request for an unpredictable number across the network to the agent. In this embodiment, it is the agent which will eventually be sending the encoded information to the manager. The agent is used to generate the unpredictable number because this configuration makes it more difficult for an interloper to inject a message transmission which results in an unpredictable number which is in some way favorable to the interloper, that is, does not fully have the desired unpredictable aspects. In an alternate embodiment, the manager both initiates the message transmission and generates the unpredictable number.

The unpredictable number is generated at the agent using a random number generator. Preferably, the unpredictable number is generated using any conventional random number generation technique which provides a number of the proper length, and which has the desired property of unpredictability.

Once the agent has generated the unpredictable number, it is sent back across the network, and received by the manager. At this point in time, labeled $T_6$ in The FIGURE, both the manager and the agent have all the information which they need in order to produce the slave key, which is the key that will be used to encode the information to be transmitted across the network, as described more completely below.

In the preferred embodiment, both the manager and the agent use the same method to produce the slave key. This is done by using the unpredictable number and the master key as input to a noninvertible function, such as a one-way function. Because a noninvertible function is used, knowledge of the both the slave key and the unpredictable number, used in the production of the slave key, is insufficient to compute the master key. As mentioned above, the unpredictable number is supplied openly across the unsecured network, and so is available to all interlopers. Thus, even if the slave key is discovered by the interloper, the master key is protected because of the use of the noninvertible function. In the preferred embodiment, message digest algorithm five is used as the noninvertible function.

Therefore, a single master key, and an unpredictable number, can be used to produce a unique slave key of sufficient intricacy to encode the message. By frequently changing the slave key used for messages transmitted between the manager and the agent, the threat of interlopers can be minimized, because the compromise of one of the slave keys will not compromise any of the messages sent using other slave keys. Further, compromise of one of the slave keys and the unpredictable number associated with it will not compromise the master key, because an unknown independent variable for a noninvertible function cannot be discovered with only the knowledge of the dependent variable and the other independent variable.

In this manner, the invention allows for a manager and an agent to transmit an indefinite number of messages between them, encoded using different slave keys. The slave key may be used to encode the message using an invertible function such as an XOR function. Alternately, a noninvertible function may be used to encode the message with the slave key.

There are times when it is preferable to have a slave key that is set to a desired value. For example, a system operator may wish to update the slave key to be used by a group of multiple agents and multiple managers, and synchronize them to a common value. Further, the system operator may wish to set the slave key to a mnemonic, and thereby more rememberable, value. The output of the invertible function using an unpredictable value as input is typically neither mnemonic nor rememberable by humans.

Therefore, in further embodiments of the present invention, the method is adaptable to provide for the production of a desired slave key in the following manner. When the manager has produced the slave key, an invertible function, such as an XOR function, is used with the slave key and the desired slave key as input, to produce a delta slave key. This delta slave key is sent across the network, and received by the agent. The agent then uses the delta slave key and the slave key as input to the same invertible function, which produces the desired slave key as designated by the manager.

In this manner the desired slave key has been produced at two different sites on the network, without having to transmit the desired slave key, or the slave key from which it was produced, across the network. In an alternate embodiment these additional steps are performed even when there is no need for a specific desired slave key. If the original slave key produced is acceptable to the manager, then it can send back a delta slave key with a value of zero, which when processed with the slave key and the invertible function by the agent, will leave the slave key unaltered.

This method of altering the slave key to a desired slave key can be performed at different times during the transmission of the message. In other words, a portion of the message can be encoded using a first slave key, and then subsequent portions of the message can be transmitted using subsequent desired slave keys. Thus, more than one slave key will be required to decode a single message. In this embodiment, the manager can control how many slave keys will be used to transmit the message, and what the slave keys will be, by periodically sending to the agent, during the message transmission, a new delta slave key which the agent will use to produce a new desired slave key, which will be used to encode the remaining portions of the message until a new delta slave key is received by the agent.

In an alternate method, the agent can, from time to time, send a new unpredictable number during the transmission of the encoded message, indicating to the manager that a new slave key is to be used to decode that portion of the message which follows the transmission of the new unpredictable number, and which is received before a new unpredictable number is transmitted. In this manner, the agent is able to control how many slave keys will be used to encode and decode the message.

In some environments, the preferred embodiment is for each manager-agent pair to have unique sets of slave key—master key pairs, because, in the event a single key pair is compromised, the interloper will still not have access to messages encoded with other key pairs. In other environments, the preferred embodiment allows key pairs to be shared between entities. For example, a manager and several agents may all use a single key pair, or several managers and a single agent may use a single key pair. Other combinations of managers and agents, all sharing a single key pair, are also possible.

The task of tracking and otherwise managing shared key pairs is reduced from that of managing key pairs that are all unique one from the other, because there are fewer key pairs. However, this benefit comes at the expense of reduced security, because if one of the shared key pairs is discovered by an interloper, he will then have the ability to decode more messages.

In a shared key pair environment, such as that described above, it is possible that two entities, such as two independent managers, may attempt to simultaneously change the slave key on a single agent. In such cases, it is important to insure that the two operations do not interfere with one another. For example, if two managers each instruct an agent to generate a new unpredictable number, it is important that the first new unpredictable number be generated and fully recorded before the second new unpredictable number is generated. For this reason the preferred embodiment has a locking mechanism, such as a spinlock, which prevents a new operation from commencing before a previously initiated operation is completed.

While preferred embodiments of the present invention are described above, and specific examples have been given for the manager-agent environment, it will be appreciated by those of ordinary skill in the art that the invention is capable of numerous modifications, rearrangements and substitutions of parts, and application to other environments without departing from the spirit of the invention.

What is claimed is:

1. A method of producing a secure slave key at each of an agent system and a manager system connected by an unsecured digital computer network comprising the steps of:

providing a master key which is known by both a manager and an agent, sending a request for an unpredictable number from the manager to the agent using the digital computer network, receiving the request for the unpredictable number at the agent, generating the unpredictable number at the agent, sending the unpredictable number from the agent to the manager using the digital computer network, receiving the unpredictable number at the manager, producing the slave key using the unpredictable number and the master key at the manager, and producing the slave key using the unpredictable number and the master key at the agent.

2. The method of claim 1 wherein both of the steps of producing the slave key further comprise producing a slave key from the master key and the unpredictable number, using a one-way function.

3. The method of claim 1 wherein both of the steps of producing the slave key further comprise producing a slave key from the master key and the unpredictable string, using message digest algorithm five.

4. The method of claim 1 wherein the step of generating an unpredictable number further comprises generating an unpredictable number using information supplied at least in part by the manager.

5. The method of claim 1 wherein the manager and the agent are subsystems of the same system.

6. A method of producing a secure slave key at each of an agent system and a manager system connected by an unsecured digital computer network comprising the steps of:

providing a master key which is known by both a manager and an agent, sending a request for an unpredictable number from the manager to the agent using the digital computer network, receiving the request for the unpredictable number at the agent, generating the unpredictable number at the agent, sending the unpredictable number from the agent to the manager using the digital computer network, receiving the unpredictable number at the manager, producing the slave key using the unpredictable number and the master key at the manager, producing the slave key using the unpredictable number and the master key at the agent, transforming the slave key using an invertible function and a desired slave key to produce a delta slave key at the manager, sending the delta slave key from the manager to the agent using the digital computer network, receiving the delta slave key at the agent, and transforming the slave key using the invertible function and the delta slave key to produce the desired slave key at the agent.

7. A method of exchanging information between a first computer and a second computer connected by an unsecured digital computer network comprising the steps of:

a) providing a master key which is known by both the first computer and the second computer, b) sending a request for an unpredictable number from the first computer to the second computer via the unsecured digital computer network, c) receiving the request for the unpredictable number at the second computer, d) generating the unpredictable number at the second computer, e) sending the unpredictable number from the second computer to the first computer via the unsecured digital computer network, f) receiving the unpredictable number at the first computer, g) producing the slave key using the unpredictable number and the master key at the first computer, h) producing the slave key using the unpredictable number and the master key at the second computer, i) encoding at least a portion of the information in the second computer using the slave key, j) sending the encoded information from the second computer to the first computer via the unsecured digital computer network, k) receiving the encoded information at the first computer, and decoding the encoded information in the first computer using the slave key.

8. The method of claim 7 wherein both of the steps of producing the slave key further comprise producing the slave key from the master key and the unpredictable number, using a one-way function.

9. The method of claim 7 wherein both of the steps of producing the slave key further comprise producing the slave key from the master key and the unpredictable number, using message digest algorithm five.

10. The method of claim 7 wherein the step of generating the unpredictable number further comprises generating the unpredictable number using information supplied at least in part by the first computer.

11. The method of claim 7 wherein the step of encoding the information further comprises encoding the information using the slave key and an invertible function.

12. The method of claim 7 wherein the step of encoding the information further comprises encoding the information using the slave key and an XOR function.

13. The method of claim 7 wherein the first computer and the second computer are the same computer.

14. A method of exchanging information between a first computer and a second computer connected by an unsecured digital computer network comprising the steps of:

a) providing a master key which is known by both the first computer and the second computer, b) sending a request for an unpredictable number from the first computer to the second computer via the unsecured digital computer network, c) receiving the request for the unpredictable number at the second computer, d) generating the unpredictable number at the second computer, e) sending the unpredictable number from the second computer to the first computer via the unsecured digital computer network, f) receiving the unpredictable number at the first computer, g) producing the slave key using the unpredictable number and the master key at the first computer, h) producing the slave key using the unpredictable number and the master key at the second computer, i) transforming the slave key using an invertible function and a desired slave key to produce a delta slave key at the first computer, j) sending the delta slave key from the first computer to the second computer using the digital computer network, k) receiving the delta slave key at the second computer, l) transforming the slave key using the invertible function and the delta slave key to produce the desired slave key at the second computer, m) using the desired slave key in place of the slave key for the subsequent steps of the method, n) encoding at least a portion of the information in the second computer using the slave key, o) sending the encoded information from the second computer to the first computer via the unsecured digital computer network, p) receiving the encoded information at the first computer, and q) decoding the encoded information in the first computer using the slave key.

15. The method of claim 14 further comprising the addition of the following steps after step (l):

l1) encoding, sending, receiving, and decoding only a portion of the information per steps (i) through (l), l2) repeating steps (h1) through (h5) at least once to produce a new desired slave key, and l3) performing steps (i) through (l) on at least a portion of the information not previously processed per steps (i) through (l), using the new desired slave key.

16. The method of claim 15 further comprising repeating steps (l1) through (l3) to produce additional desired slave keys, and using the additional desired slave keys in performing steps (i) through (l) until all of the information has been processed per steps (i) through (l).

17. A method of exchanging information comprising the steps of:

a) providing a manager residing on a computer, b) providing an agent residing on a computer, c) providing a digital computer network between the manager and the agent, d) providing a master key which is known by both the manager and the agent, e) sending a request for an unpredictable number from the manager to the agent via the digital computer network, f) receiving the request for the unpredictable number at the agent, g) generating the unpredictable number at the agent, h) sending the unpredictable number from the agent to the manager via the digital computer network, i) receiving the unpredictable number at the manager, j) producing the slave key using the unpredictable number and the master key at the manager, k) producing the slave key using the unpredictable number and the master key at the agent, l) encoding at least a portion of the information in the agent using the slave key, m) sending the encoded information from the agent to the manager via the digital computer network, n) receiving the encoded information at the manager, and o) decoding the encoded information in the manager using the slave key.

18. The method of claim 17 wherein steps (a) and (b) further comprise providing the agent and the manager on the same computer.

19. The method of claim 17 wherein steps (a) and (b) further comprise providing the agent and the manager on different computers.

20. The method of claim 17 wherein step (c) further comprises providing an external digital computer network between the manager and the agent.

21. The method of claim 17 wherein step (c) further comprises providing an internal digital computer network between the manager and the agent.

* * * * *

UNITED STATES PATENT AND TRADEMARK OFFICE
CERTIFICATE OF CORRECTION

PATENT NO. : 5,720,034

DATED : February 17, 1998

INVENTOR(S) : Jeffrey D. Case

It is certified that error appears in the above-indentified patent and that said Letters Patent is hereby corrected as shown below:

column 8, claim 7, line 31 before "decoding"

insert -- I) --

Signed and Sealed this

Twenty-third Day of June, 1998

Attest:

BRUCE LEHMAN

Attesting Officer

Commissioner of Patents and Trademarks